United States Patent [19]

Templeman

[11] Patent Number: 4,565,345
[45] Date of Patent: * Jan. 21, 1986

[54] MIRROR ASSEMBLY

[75] Inventor: Arthur R. Templeman, Stillwell, Kans.

[73] Assignee: Peterson Manufacturing Company, Grandview, Mo.

[ * ] Notice: The portion of the term of this patent subsequent to Jun. 4, 2002 has been disclaimed.

[21] Appl. No.: 709,605

[22] Filed: Mar. 7, 1985

Related U.S. Application Data

[63] Continuation of Ser. No. 317,835, Nov. 3, 1981, Pat. No. 4,520,983.

[51] Int. Cl.$^4$ .............................................. A47G 1/24
[52] U.S. Cl. ...................................... 248/481; 403/90
[58] Field of Search ...................... 248/481, 181, 288.3, 248/288.5, 663; 403/90, 131, 122, 145

[56] References Cited

U.S. PATENT DOCUMENTS

| | | |
|---|---|---|
| 880,415 | 2/1908 | Stevens . |
| 2,465,751 | 3/1949 | Robins . |
| 2,895,380 | 7/1959 | Kurlytis . |
| 2,984,249 | 5/1961 | Sears, Jr. et al. . |
| 3,235,294 | 2/1966 | Naylor et al. . |
| 3,427,095 | 2/1969 | Dykema . |
| 3,498,579 | 3/1970 | Vicary . |
| 3,712,715 | 1/1973 | Wagner . |

FOREIGN PATENT DOCUMENTS 728329 12/1966 Italy .

Primary Examiner—J. Franklin Foss
Assistant Examiner—Robert A. Olson
Attorney, Agent, or Firm—Litman, Day and McMahon

[57] ABSTRACT

A mirror assembly is provided adapted for use with a vehicle and includes a mirror housing, a mirror, a support bracket for mounting the mirror housing on an associated vehicle and an expandable ball and socket arrangement associated with the mirror housing and support bracket for selectively retaining the mirror in a desired rotational position relative to the vehicle. The ball and socket arrangement comprises a partially spherical socket formed in the mirror housing, a thin-walled socket liner retained therein and an expandable ball securely connected to the mounting bracket. The expandable ball comprises a plurality of partially spherical segments each attached to a shank and resiliently deformable outwardly from an axial bore therethrough. A draw bolt is received in the axial bore and when drawn therethrough, engages the spherical segments biasing same outwardly to resistably engage the socket liner.

1 Claim, 6 Drawing Figures

MIRROR ASSEMBLY

CROSS-REFERENCE TO RELATED APPLICATION

The present application is a continuation of application Ser. No. 317,835 on a Mirror Assembly, filed Nov. 3, 1981, now U.S. Pat. No. 4,520,983.

BACKGROUND OF THE INVENTION

This invention relates to vehicular mirror assemblies in general and in particular to a vehicular mirror assembly which includes an expandable ball and socket arrangement to securely retain the mirror in a desired rotational position relative to an associated vehicle.

It is desirable when driving vehicles to have mirrors which extend outwardly of the vehicle. This is especially true in driving large trucks, campers or the like where vision through an interior rear view mirror would be obstructed. A problem associated with outside rear view mirrors is that of securely retaining the rear view mirror in a desired rotational position relative to the vehicle and hence to a driver of the vehicle such that the driver can easily view the roadway behind. Such phenomena as wind resistance, vibration, etc., tend to force prior art rearview mirror assemblies out of proper desired visual aligment. These problems are further increased when the size of the rearview mirror necessarily is large as is the case with large tractor trailer trucks and the like. Prior devices have generally been unable to effectively retain the mirrors in a desired rotational position relative to the driver.

OBJECTS OF THE INVENTION

Therefore, the objects of the present invention are: to provide a mirror assembly for use with an associated motor vehicle which includes a mirror housing retaining a mirror therein, a vehicular mounting bracket therefor and an expandable ball and socket arrangement associated with the mirror housing and vehicular mounting bracket to retain the mirror in a desired rotational position relative to the vehicle; to provide such an expandable ball and socket arrangement wherein the mirror frame includes a substantially spherical socket therein and the mounting bracket includes an expandable ball which is received within the socket; to further provide such a ball and socket arrangement wherein the mirror housing which forms the substantially spherical socket is fabricated of an easily molded low strength material and includes retained therein a socket liner of a substantially high strength material for providing a desired degree of structural rigidity to the socket; to further provide such an arrangement wherein the expandable ball member includes a plurality of partially spherical members attached to a shank thereof with the partially spherical members including an outer surface mateable with the socket liner; to provide such an arrangement wherein the partially spherical members include an upwardly and outwardly extending wedge face at a free end thereof which engages a parallel face of a draw bolt which biases the partially spherical members outwardly into resistive contact with the socket liner; to further provide for such an arrangement a draw bolt which is received through an axial bore in the ball member shank and includes at a free end thereof a suitable means to draw the bolt through the shank; and to provide such a mirror assembly which is easy to manufacture, light, in weight, capable of securely retaining a mirror thereof in desired rotational position relative to an associated vehicle and which is particularly well adapted for the intended usage thereof.

Other objects and advantages of this invention will become apparent from the following description taken in connection with the accompanying drawings wherein are set forth, by way of illustration and example, certain embodiments of this invention.

The drawings constitute a part of this specification and include exemplary embodiments of the present invention and illustrate various objects and features thereof.

DETAILED DESCRIPTION OF THE PREFERRED EMBODIMENT

Figure 1:
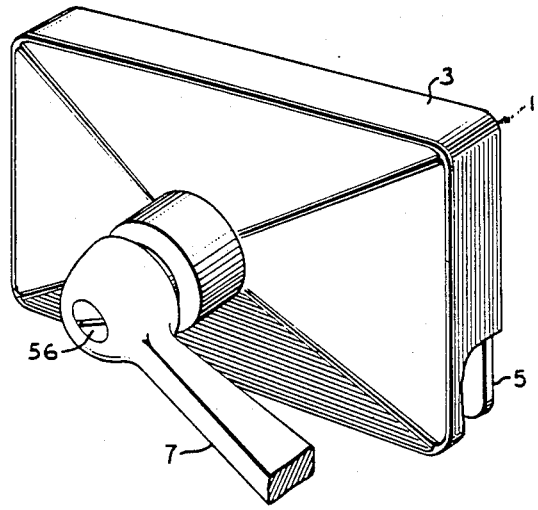
FIG. 1 is a perspective view of a mirror assembly according to the present invention.
Figure 2:
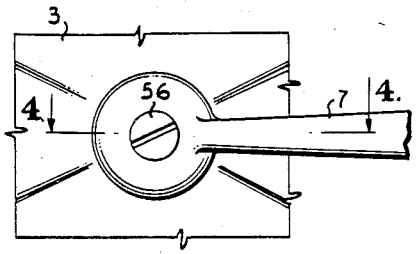
FIG. 2 is a fragmentary elevational view of the assembly.

As required, detailed embodiments of the present invention are disclosed herein; however, it is to be understood that the disclosed embodiments are merely exemplary of the invention which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

The reference numeral 1 generally designates a mirror assembly according to the present invention shown herein as including a mirror housing 3 retaining therein a mirror 5 for reflecting a desired view to a user thereof. A support member 7 is provided for supporting the mirror housing 3 and mirror 5 on an associated vehicle (not shown), and an expandable ball and socket arrangement 9 is provided for mounting the mirror housing 3 onto the support member 7. The expandable ball and socket arrangement 9 allows the mirror 5 to be securely retained in a desired rotational position relative to the associated vehicle so that the mirror 5 is in proper visual alignment with the user. Although the ball and socket arrangement 9 is shown herein as mounting a mirror 3 onto an associated vehicle, it is understood that the ball and socket 9 can be used to retain any movable item in a desired rotational position relative to an associated supporting structure.

As shown herein, the ball and socket arrangement 9 includes a substantially spherical socket 11 comprising a spherical indentation 12 extending into the mirror housing 3, and an expandable ball member 13. The socket 11 exhibits a surface 15 thereof and includes an opening 17 thereinto.

The socket 11 further includes a partially spherical nondeformable thin walled socket liner 19 which is received into the socket indentation 12 and which has an inner surface 18 which engages the socket surface 15.

The liner 19 includes an opening 20 which is coextensive with socket opening 17. The socket liner 19 is retained in socket 11 by lips 21 which extend outwardly from the liner opening 20 and which are imbedded in the mirror housing 3, securely retaining the liner 19 into the socket 11. Preferably, the liner 19 is prevented from rotating relative to the socket 11. Lugs 22 extending outwardly from the socket surface 15 mate with apertures 23 in socket liner 19 to prevent such rotation.

Figure 3:
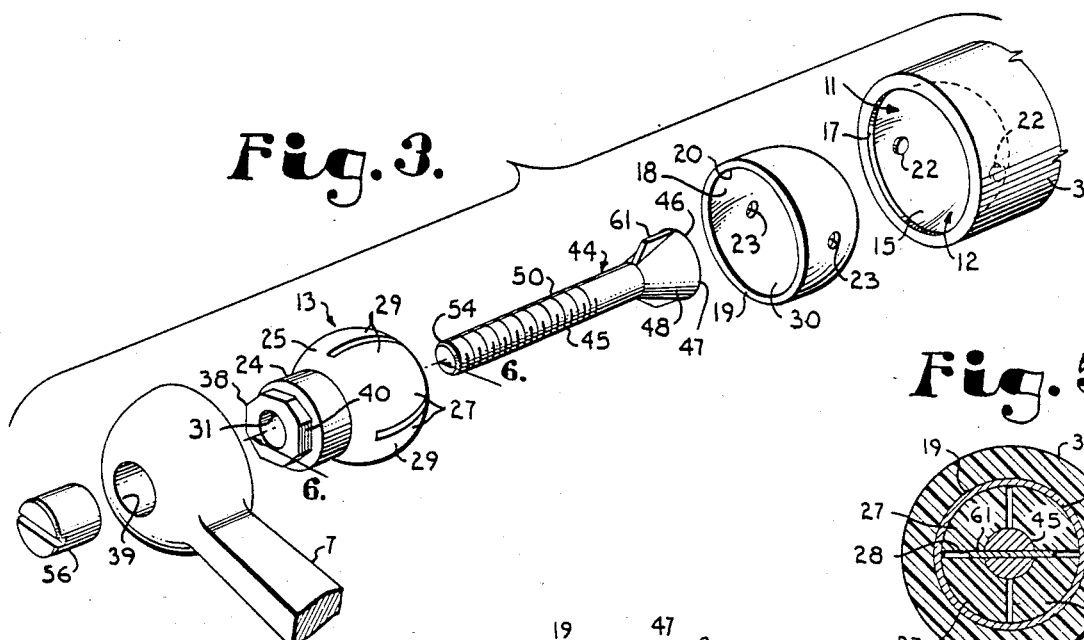
FIG. 3 is an enlarged, exploded view of the assembly showing the expandable ball and socket arrangement.
Figure 5:
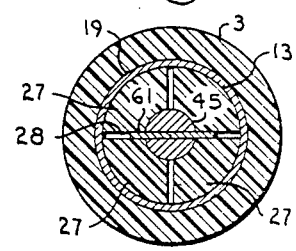
FIG. 5 is an enlarged cross-sectional view taken generally along line 5—5 in FIG. 4.
Figures 4, 6:
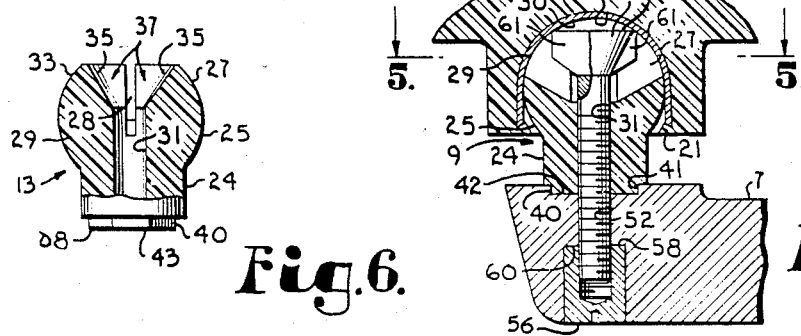
FIG. 4 is an enlarged cross-sectional view taken generally along line 4—4 in FIG. 2.
FIG. 6 is a cross-sectional view taken generally along line 6—6 in FIG. 3.

The expandable ball member 13 comprises a shank 24 and a substantially spherical head 25 which is operably received in the socket 11. The ball member head 25 comprises a plurality of laterally spaced partially spherical segments 27 which have slots or relief grooves 28 formed therebetween. The segments 27 are resiliently deformable outwardly from an axis extending through the shank 24 to a point where an outer surface 29 each thereof engages an outer surface 30 of socket liner 19. As seen in FIG. 3, the ball member 13 further includes an axial bore or passageway 31 extending therethrough.

The expandable ball segments 27 each include at a free end 33 thereof, spaced from the shank 24, an outwardly expanding face 35. The face segments 35 form collectively an inner surface of a frustrum. As shown herein, the segment faces 35 collectively form a substantially frusto-conical surface 37, the purpose of which will be explained later.

The ball member shank 24 includes a free end 38 which is received into a recess 39 in the support member 7. As shown herein, the shank free end 38 and support member recess 39 comprise an octagon. The shank free end 38 and recess 39 further include mating lateral surfaces, 40 and 41 respectively, which prohibit the ball member 13 from rotating about an axis thereof relative to the support member 7. The support member recess 39 includes an outwardly opening surface 42 which operably engages an end surface 43 of the ball member 13.

A means to bias the segments 27 outwardly is provided and comprises a draw bolt 44 which is received in the expandable ball member bore 31. The draw bolt 44 includes a shank 45 and a head 46. The draw bolt head 46 includes a generally flat end face 47 and a skirt 48 extending between a periphery of the end face 47 and an outer surface 50 of the bolt shank 45. The bolt skirt 48 comprises an outer surface of a frustrum and mates with the ball member segment faces 35. As shown herein, the skirt 48 is frusto-conical in shape. Further, as shown in FIG. 3, the draw bolt shank 45 extends through the ball member shank 24 and through bore 52 in the support member 7. A draw bolt distal end 54 includes a plurality of threads 55 thereon over which is received a suitable retainer shown herein as a slotted cap nut 56. The nut 56 includes an inner face 58 which bears against a bearing surface 60 of the support member 7.

In order to prevent the draw bolt 44 from rotating with the nut 56, the draw bolt head 45 includes keys 61 extending outwardly therefrom which are received in the ball member head relief grooves 28.

It is noted that although the mating surfaces of the draw bolt 44 and segments 27, in particular, respectively, the draw bolt skirt 48 and segment faces 35, are shown herein as being conical, it is envisioned that the segment faces 35 could be planar such as to collectively form a frusto-pyramidal shape. The draw bolt skirt 48 would then include surfaces (not shown), which would mate therewith. Also, even though there are four segments 27 shown herein, it is envisioned that expandable ball member head 25 could comprise a different number of segments greater than one and still function according to the present invention.

The mirror housing 3 is preferably fabricated of a lightweight, inexpensive plastic material for economic reasons. The ball member 13 is fabricated of a resiliently deformable material such as thirty percent (30%) glass filled nylon. The socket liner 19 is fabricated of a material exhibiting suitably high strength such as a suitable mild steel. The socket liner 19 is necessitated by the fact that the plastic comprising the mirror housing 3, although inexpensive and easily formed, does not exhibit the strength required to sustain the friction forces necessary to prevent the mirror housing 3 from rotating relative to the ball member 13.

In use, a mirror housing having an expandable ball member 13 placed therein is secured to a suitable support member 7 by placement of the draw bolt shank 45 through the support member aperture 52. The retaining nut 56 is threaded on the draw bolt shank distal end 54 to a position where the retaining nut inner face 58 begins to engage the support member bearing surface 60. Preferably, at this time, the draw bolt head conical skirt 48 is spaced from the segment faces 35 and the mirror housing 3 is still free to rotate relative to the support member 7. When the mirror housing 3 is positioned in a desired degree of rotation relative to the support member 7 such that a user of the mirror assembly 1 has positioned the mirror 5 in proper visual alignment, the retaining nut 56 is rotated relative to the draw bolt shank 42 which forces the draw bolt skirt 48 into engagement with the segment faces 35. As the nut 56 is rotated further, the draw bolt 44 is urged through the ball member bore 31 in a direction toward the nut 56. In doing so, the draw bolt skirt 48 forces the segments 27 outwardly into frictional engagement with the socket liner outer surface 30. The friction between the segment outer surfaces 29 and the socket liner outer surface 30 can be adjusted by adjusting the retaining nut 56 on the draw bolt 44. By tightening the nut 56 on the draw bolt 40 sufficiently, the friction between the segment outer surfaces 29 and the liner outer surface 30 can be increased to an extent that the mirror housing 3 is substantially prevented from rotational movement relative to the support member 7 thereby retaining the mirror 5 in a desired rotational position relative to the user.

When the segments 27 are forced outwardly into engagement with the socket liner 19, outwardly acting radial forces are exterted on the liner 19. The material which comprises the mirror housing 3 does not exhibit enough strength to resist deformation under such loads. As such, the frictional force necessary to prevent rotation between the ball member 13 and the mirror housing 3 cannot be attained. By placing the non-deformable liner 19 in the socket 11, the required frictional forces can be achieved while still allowing the major portions of the mirror housing 3 to be formed of an inexpensive plastic, thus reducing the cost of the mirror assembly 1.

It is to be understood that while certain forms of this invention have been illustrated and described herein, it is not to be limited to the specific forms or arrangement of parts herein described and shown.

What is claimed and desired to be secured by Letters Patent is as follows:

1. A mirror assembly for use with a vehicle comprising:
   (a) a mirror housing;
   (b) a mirror retainably held in said housing;

(c) a support member adapted to be securely mounted to a vehicle; and
(d) a ball and socket arrangement connecting said housing and said support member, said ball and socket arrangement comprising:
  (1) a socket extending into a first of said housing or support member and having an inner surface;
  (2) a socket liner snugly mateable in said socket in contact with said socket inner surface; said socket liner including a neck and a concave expandable member receiving cavity extending inwardly of said neck; said expandable member receiving cavity being generally continuous and covering a majority of said socket when said socket liner is positioned within said socket;
  (3) retention means to snugly hold said socket liner within said socket so as to interfere with removal of said socket liner from said socket;
  (4) said retention means comprises a lug on a first of said socket liner or said socket and an aperture mateable with said lug on a second of said socket liner or said socket;
  (5) an expandable member including a head and a shank; said expandable member head being slidably received in said socket through said neck when said expandable member is not expanded and frictionally contacting said socket liner when said expandable member is expanded so as to operably retain said head in said expandable member receiving cavity;
  (6) connector means to connect said expandable member shank to a second of said housing or said support member; and
  (7) biasing means to selectively urge said expandable member head into tight engagement with said socket liner.

* * * * *